(No Model.) 2 Sheets—Sheet 1.

S. O. TUERK.
MOTOR DRIVEN FAN.

No. 570,651. Patented Nov. 3, 1896.

WITNESSES:
Charles Morvin
Maude E. Cooke

INVENTOR
Samuel O. Tuerk
BY
Smith & Kinison
ATTORNEYS.

(No Model.) 2 Sheets—Sheet 2.

S. O. TUERK.
MOTOR DRIVEN FAN.

No. 570,651. Patented Nov. 3, 1896.

WITNESSES:

INVENTOR
Samuel O. Tuerk
BY
Smith & Munson
ATTORNEYS.

UNITED STATES PATENT OFFICE.

SAMUEL O. TUERK, OF FULTON, NEW YORK.

MOTOR-DRIVEN FAN.

SPECIFICATION forming part of Letters Patent No. 570,651, dated November 3, 1896.

Application filed April 27, 1896. Serial No. 589,156. (No model.)

*To all whom it may concern:*

Be it known that I, SAMUEL O. TUERK, of Fulton, in the county of Oswego, in the State of New York, have invented new and useful Improvements in Motor-Driven Fans, of which the following, taken in connection with the accompanying drawings, is a full, clear, and exact description.

My invention relates to motor-driven fans of the type shown and described in Letters Patent of the United States granted to me February 25, 1896, No. 555,294. That construction embodied a case upon which the fan-arms are carried, a stationary motor-box within the case, a motor therein, a shaft driven by the motor, a pulley on said shaft, case-driving wheels journaled upon shafts mounted upon the motor-box and standing out of parallelism with said shaft and with each other, said wheels engaging inwardly with said pulley and outwardly with said case and both driving and supporting it.

My present invention embodies a construction in which the motor-box supports the case inclosing it, as well as the motor-shaft and drive-pulley, and also supports the case-driving wheels, which are journaled upon shafts carried by said box and standing parallel with said shaft and with each other, suitable tires being suitably mounted upon said wheels, which bear upon the drive-pulley and the case, all so that all of the parts are directly supported by the yoke instead of having the case carried by the drive-wheels.

It is constructed as follows, reference being had to the accompanying drawings, in which—

Figure 1:
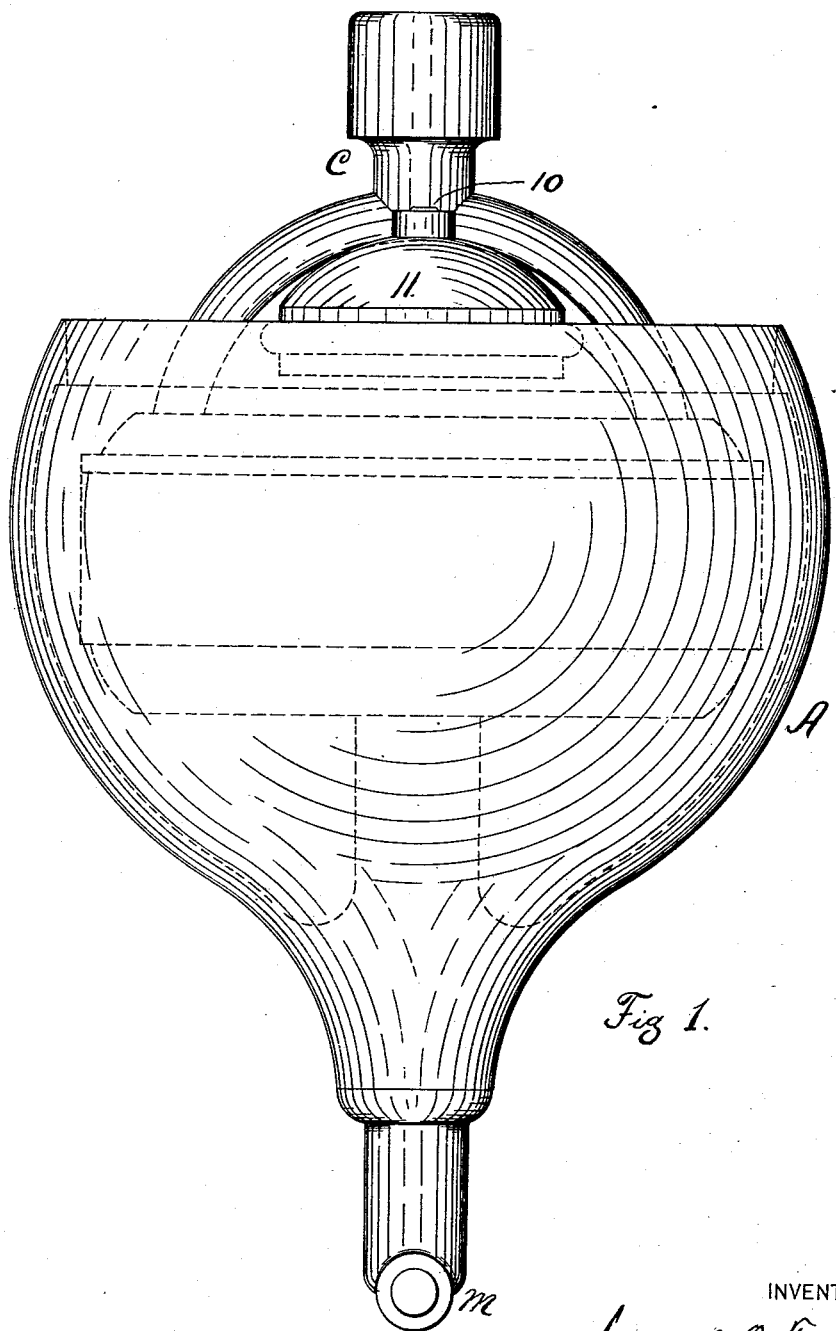
Figure 2:
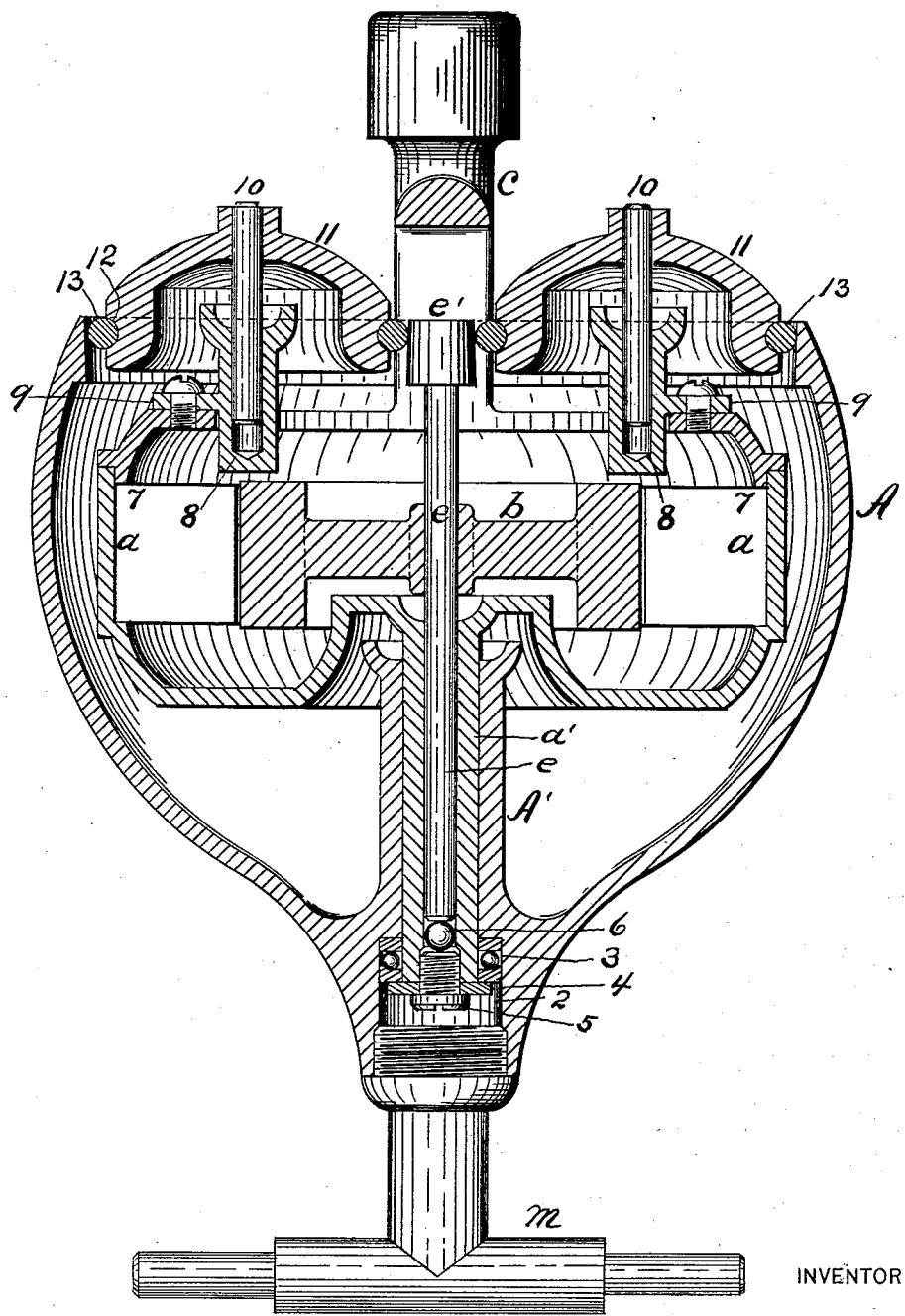

Figure 1 is a side elevation of the motor and fan-arms. Fig. 2 is a vertical sectional elevation of the same.

The case A and the motor-box $a$ therein, the motor $b$ in said box, the yoke $c$, which supports the motor and motor-box from a suitable hanger, the fan-arms $m$, the motor-shaft E, the drive-pulley $e'$, the stem $a'$ upon the motor-box, and the tubular shank $A'$ within the case are all constructed substantially as shown and described in said patent.

The shank $A'$ is recessed interiorly, as at 2, to receive the ball-races and balls 3, which are supported by the washer 4 and screw 5 through it into the stem $a'$, and 6 is a ball carried by said screw and which supports the shaft $e$ and constitutes its step.

The motor-box is partly closed by a ring 7, to which the yoke is connected. Bearing-sockets 8, provided with lateral arms 9, are secured to said ring by screws substantially as shown, so that the shafts 10, which have their bearings in them, stand vertical and parallel to each other and to the drive-shaft. Upon these shafts the drive-wheels 11 are secured, having a suitable groove 12 the periphery of each, and 13 is a tire in each of said grooves bearing against the case and also against the drive-pulley, so that the motor will drive said pulley, said wheels, and the case and fan-arms thereon, the weight of these wheels and their shafts making the frictional contact on the case and drive-pulley.

The washer 4 and screw 5 and motor-box stem $a'$ therefore through the yoke carry the case and the fan-arms, and said case revolves ball-bearing 3 around the stem $a'$.

It will be seen that the drive-wheel shafts do not extend to the bottom of the recesses in their bearings, whereby provision is made that the wear upon the tires is automatically taken up by the gravity of said wheels and their shafts.

What I claim as my invention, and desire to secure by Letters Patent, is—

1. The combination with a supporting-yoke, a motor-box, secured thereto, and provided with a stem, a motor in said box, of a case inclosing said box and provided with a tubular shank receiving said stem and bearing rotatably upon a washer secured to said stem whereby said yoke carries all of said parts.

2. The combination with a supporting-yoke, a motor-box secured thereto, and provided with a stem, a drive-shaft journaled in said stem, a motor in said box secured to said shaft, a pulley secured upon said shaft, shafts journaled in bearings upon said box parallel to each other and to said drive-shaft, and drive-wheels secured upon said shafts and engaging with said pulley and with a case, a case inclosing said motor-box, and fan-arms secured to said case and driven by its rotation.

3. The combination with a supporting-yoke, a motor-box secured thereto and provided with a tubular stem, a motor in said box, a motor-shaft journaled in said stem of a case inclosing said box and provided with a tubular shank receiving said stem and connected thereto in such manner that said case is supported by said yoke and revolves around said stem, a drive-pulley upon said shaft, vertical bearings mounted upon said box, shafts journaled in them, and drive-wheels upon said shafts and engaging with and supported by said pulley and case and transmitting the rotation of said pulley to said case.

In witness whereof I have hereunto set my hand this 20th day of April, 1896.

SAMUEL O. TUERK.

In presence of—
AMOS YOUMANS,
C. R. DINES.